(12) United States Patent
Hohmann et al.

(10) Patent No.: US 8,443,831 B2
(45) Date of Patent: May 21, 2013

(54) SAFETY DEVICE FOR A HIGH-PRESSURE CONNECTOR OF A HYDRAULIC DEVICE

(76) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 411 days.

(21) Appl. No.: 12/623,494

(22) Filed: Nov. 23, 2009

(65) Prior Publication Data
US 2010/0126592 A1 May 27, 2010

(30) Foreign Application Priority Data

Nov. 25, 2008 (DE) .......................... 10 2008 058 923

(51) Int. Cl.
*F16L 35/00* (2006.01)

(52) U.S. Cl.
USPC ............. 137/377; 137/312; 285/13; 81/57.38

(58) Field of Classification Search
USPC ......... 137/312, 377; 285/13, 14, 45; 81/57.38
See application file for complete search history.

(56) References Cited

U.S. PATENT DOCUMENTS

| | | | |
|---|---|---|---|
| 3,973,791 A * | 8/1976 | Porta et al. ................ 285/305 |
| 4,260,184 A * | 4/1981 | Greenawalt et al. ........ 285/305 |
| 4,341,235 A * | 7/1982 | Nord ........................... 137/312 |
| 5,538,292 A * | 7/1996 | Sommer ...................... 285/13 |
| 5,682,025 A | 10/1997 | Hohmann et al. |
| 5,788,292 A | 8/1998 | Körner et al. |
| 5,829,472 A * | 11/1998 | Greenwood et al. ........ 137/312 |
| 6,290,263 B1 * | 9/2001 | Murken ........................... 285/13 |
| 6,435,564 B1 * | 8/2002 | Hohmann et al. ............ 285/115 |
| 6,698,669 B2 * | 3/2004 | Rieben ...................... 239/225.1 |
| 6,851,720 B2 * | 2/2005 | Hayashi et al. ................. 285/13 |
| 2003/0080559 A1 * | 5/2003 | Hofmann et al. ............ 285/305 |
| 2006/0157592 A1 * | 7/2006 | Mahnken et al. ............ 239/461 |
| 2007/0020061 A1 * | 1/2007 | Hohmann et al. ........... 411/14.5 |
| 2008/0034925 A1 | 2/2008 | Hohmann et al. |

FOREIGN PATENT DOCUMENTS

| | | |
|---|---|---|
| DE | 8522245 U1 | 10/1985 |
| DE | 9100903 U1 | 5/1991 |
| DE | 10035691 A1 | 4/2001 |
| DE | 102004019425 A1 | 11/2006 |

OTHER PUBLICATIONS

Machine translation of DE 9100903.*

* cited by examiner

*Primary Examiner* — John Fox
*Assistant Examiner* — Kevin Murphy
(74) *Attorney, Agent, or Firm* — Gudrun E. Huckett

(57) ABSTRACT

A safety device on a high-pressure connector of a hydraulic device has a shield that surrounds the high-pressure connector and catches hydraulic liquid that escapes at high pressure. The shield has a housing surrounding seal-tightly a pressure medium distributor on the hydraulic device and has furthermore a protective pipe connected to the housing and surrounding a connecting nipple for a high-pressure hose conduit adapted to be coupled by a hose coupling.

7 Claims, 1 Drawing Sheet

SAFETY DEVICE FOR A HIGH-PRESSURE CONNECTOR OF A HYDRAULIC DEVICE

BACKGROUND OF THE INVENTION

The invention concerns a safety device for a high-pressure connector of a hydraulic device, in particular a hydraulic screw tensioning device.

U.S. 2008/034925 A1 discloses a screw tensioning device comprised of a hydraulic cylinder that is supported on a machine part that is to be tightened by means of a threaded bolt and a nut. Arranged therein is a seal-tightly guided piston that together with the cylinder forms an annular chamber that is supported on an extension of a change sleeve that is screwed onto a thread of the threaded bolt. A further component of the device is a controlled pressure medium supply to the annular chamber.

Such a screw tensioning device enables that a precisely predetermined purely axial pretensioning force is applied to a screw in order to tighten or release the nut that is screwed onto the screw. For this purpose, a change sleeve of the screw tightening device is screwed onto the thread projecting upwardly past the nut and subsequently the screw tensioning device is pressurized with hydraulic pressure. This has the result that the screw is tensioned purely by axial lengthening. The tensile forces that are applied onto the screw are extremely high so that the screw tensioning device and its individual parts are greatly stressed because the hydraulic pressures can be up to 4,000 bar.

DE 100 35 691 A1 discloses a high-pressure hose conduit for connecting a high-pressure pump to a hydraulic screw connecting device that is secured against throwing off parts of the high-pressure hose conduit upon breakage of these parts. For this purpose, the high-pressure hose conduit is provided with a press-in nipple that is pressed into it and comprises a cylindrical area and a conical area that widens toward an area of the press-in nipple projecting from the high-pressure hose; moreover, grooves on the exterior side of the areas; moreover, a press-in sleeve that effects the pressure-tight connection between the high-pressure hose and the press-in nipple, that spans both, and that extends across the length of the areas but is press-fit on the high-pressure hose only in the conical area; and an elongate safety sleeve that is attached at least by friction connection to the area of the press-in nipple projecting from the high-pressure hose and from the press-in sleeve and to the exterior side of the press-in sleeve. This screw tensioning device and the high-pressure hose conduit that is employed therein have proven successful in practice but it has been found that in individual cases in the area of the high-pressure connector on the hydraulic device leaks may occur. The hydraulic fluid that escapes in this context at high pressure may represent a risk of injury for operating personnel in the vicinity.

SUMMARY OF THE INVENTION

Accordingly, it is an object of the invention to provide a safety device on a high-pressure connector for hydraulic devices that prevents in case of leaks spraying of hydraulic fluid at high pressure.

As a solution to this object in a safety device of the high-pressure connector for hydraulic devices, in particular hydraulically operated screw tensioning devices, a shield is provided that surrounds the high-pressure connector and that catches hydraulic fluid that escapes at high pressure.

This shield is arranged in the area of the attachment of the high-pressure connector on the hydraulic device as well as of the connector of a high-pressure hose conduit on the high-pressure connector in such a way that in case of hydraulic liquid escaping at high pressure the hydraulic liquid is caught by the shield. i.e., can flow out of this shield only in a pressureless state or at greatly reduced pressure so that there is no danger for operating personnel in the vicinity.

Preferably, the shield is comprised of a housing that surrounds in a seal-tight manner a pressure medium distributor and a protective pipe that surrounds a connecting nipple for a high-pressure hose conduit that can be coupled by means of a hose coupling to the connecting nipple.

The protective pipe can preferably be screw-connected to a threaded socket on the housing surrounding the connecting nipple and not only surrounds the connecting nipple but also surrounds protectively a portion of the high-pressure hose conduit so that this area of the high-pressure hose conduit is protected against buckling and the hydraulic liquid that is under high pressure is caught by the protective pipe upon rupture of the high-pressure hose conduit or breaking off of the connecting nipple.

The protective pipe can be configured at the same time as a holding and carrying handle for the screw tensioning device and can be provided additionally with ergonomically designed gripping grooves on its outer circumference so that handling of the screw connecting device is facilitated.

When the protective pipe is a part of the shield and the protective pipe surrounds the hose coupling of the high-pressure hose conduit that can be coupled to the high-pressure connector, the risk of accidental release of the hose coupling from the high-pressure connector can be prevented by at least one locking member that secures the hose coupling in the longitudinal direction relative to the protective pipe.

Preferably, the locking member is arranged to be transversely movable in the protective pipe and engages with at least one locking section form-fittingly a recess or undercut of the hose coupling. In particular, the locking member can be designed such that it form-fittingly engages a circumferential groove provided externally on the hose coupling.

According to an advantageous embodiment, the locking member is embodied as a fork that can be pushed through transverse openings of the protective pipe, wherein between its two prongs the hose coupling is passed through in order to lock it in this way in the longitudinal direction.

BRIEF DESCRIPTION OF THE DRAWINGS

The invention will be explained in the following with an embodiment illustrated in the drawing.

DESCRIPTION OF PREFERRED EMBODIMENTS

Figure 1:
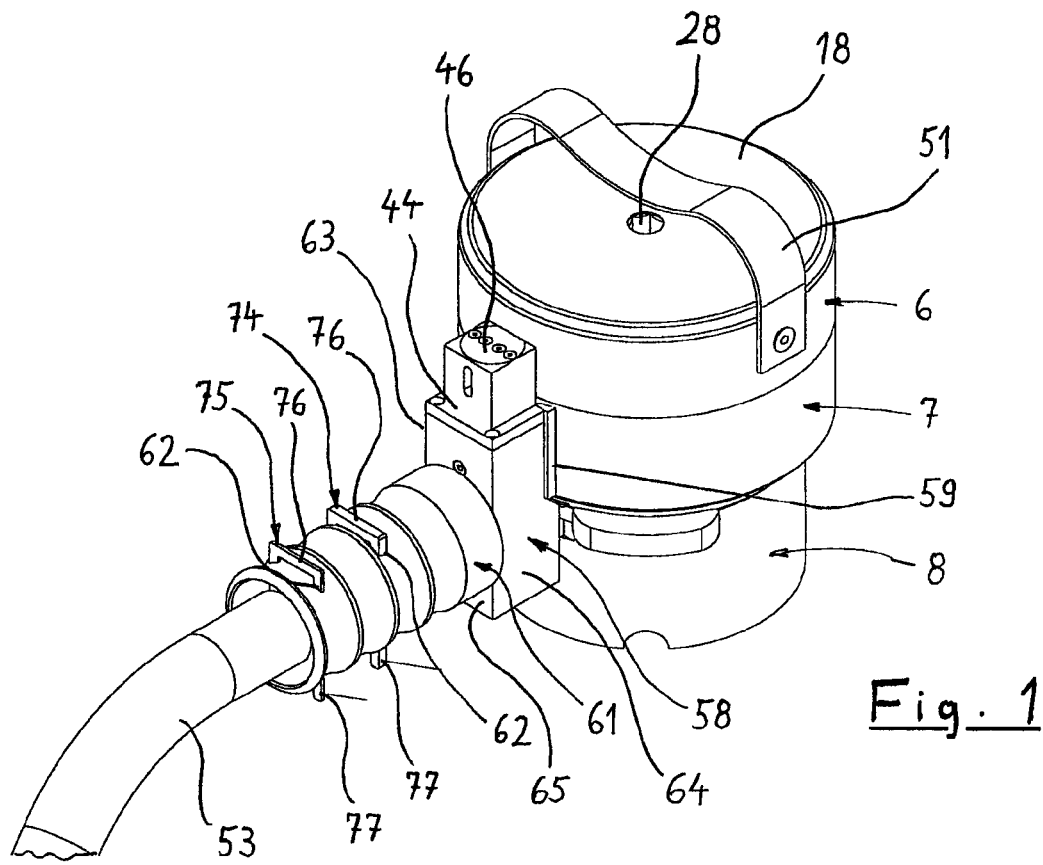
FIG. 1 shows a perspective view of a safety device on a hydraulic screw tensioning device.

A screw tensioning device where the safety device according to the invention may be arranged is disclosed in detail, for example, in U.S. 2008/0034925 A1 owned by instant applicant. The disclosure of this reference is therefore incorporated by reference in its entirety into the instant specification. Same parts in the present invention and in U.S. 2008/0034925 A1 are identified with same reference numerals.

FIG. 1 shows of the screw tensioning device the outer cylinder elements 6, 7 and a section 8 on the cylinder element 7 which section is supported on a machine part. The cylinder element 6 is closed off by a cap 18 that has on its centrally arranged opening a hexagon socket 28 that serves for receiving a tool for turning a change sleeve. By means of a grip strap 51 the screw tensioning device can be handled.

Laterally on the outer cylinder elements 6, 7 there is a pressure medium distributor 44 attached by screwing. It can also be serving as a receptacle for a load reversal counter 46 whose function is disclosed in U.S. Pat. No. 5,682,025 the disclosure of which is incorporated by reference.

Figure 2:
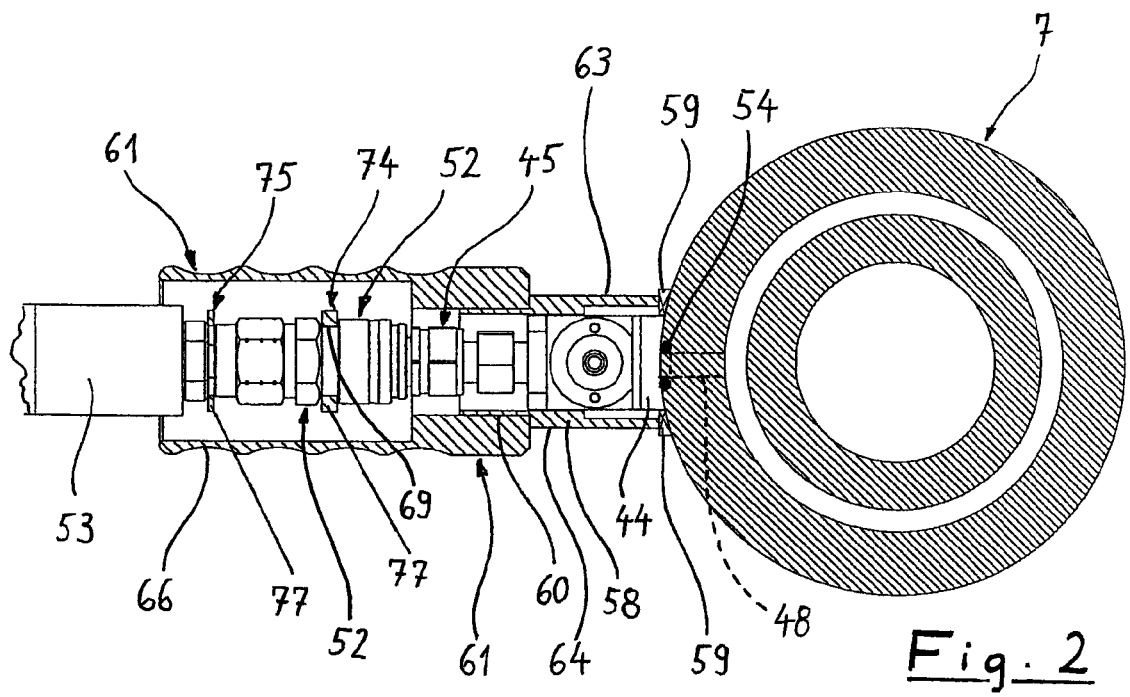
FIG. 2 is a horizontal section through the safety device and the screw tensioning device according to FIG. 1 at the level of the safety device.

FIG. 2 shows that in the pressure medium distributor 44 a connecting nipple 45 is screwed in with which the hose coupling 52 of a high-pressure hose conduit 53 can be hydraulically and seal-tightly coupled. Pressure medium distribution bores within the pressure medium distributor 44 communicate with bores 48 that extend into hydraulic working chambers within the cylinder elements 6, 7. The sealing action between the pressure medium distributor 44 and the respective cylinder element 6, 7 is ensured by O-ring seals 54. By means of the pressure medium distribution bores the hydraulic liquid supplied via the high-pressure hose conduit 53 reaches the pressure chamber with working piston in the interior of the cylinder elements 6, 7.

The areas that in case of escape of the high-pressure hydraulic liquid are endangered are located in the area of the O-ring seals 54, in the area of the sealing surfaces of the connecting nipple 45, and in the area of the sealing surface between the connecting nipple 45 and the hose coupling 52. In this way, a shield 58 in the form of a housing that surrounds lightly the pressure medium distributor 44 is provided. The shield 58 is anchored in a suitable way relative to the screw tensioning device, for example, by attachment on the pressure medium distributor 44 that has the shape of a parallelepiped.

The housing or the shield 58 is also approximately parallelepipedal; it is designed to be open toward the hydraulic device 6, 7, 8 and is closed on two sides 63, 64. On the side 65 that is facing away from the hydraulic device the housing 58 is closed also with the exception of the required opening for the hydraulic connector. The housing 58 is sealed at its open side by means of seals 59 relative to the cylinder elements 6, 7. Preferably, the housing 58 is supported with intermediate positioning of the seals 59 on the wall, i.e., the outer side of the cylinder elements 6, 7.

On the exterior side 65 of the shield 58 a threaded socket 60 is provided that surrounds the connecting nipple 45 at a spacing and is a monolithic component of the housing 58. A protective pipe 61 can be screwed onto this threaded socket 60. This protective pipe 61 is rigid and has such a length that it receives the hose coupling 52 and also a section of the length of the high-pressure hose conduit 53, i.e., it surrounds it.

The protective pipe 61 that is open outwardly serves at the same time as a handle for handling the screw tensioning device and is for this purpose provided with ergonomically designed gripping grooves 66 on its outer surface.

If in the area of the O-ring seals 54 the high-pressure hydraulic liquid escapes, the shield 58 and the seals 59 will prevent that it is ejected with a sharp and non-braked jet into the surroundings. Instead, the hydraulic liquid is trapped in the housing 58 and can then flow out substantially pressureless through the protective pipe 61 or from other less sealtight areas of the shield 58. The same holds true for hydraulic liquid that escapes at other sealing surfaces and can rebound in the protective pipe 61 and in this way can be braked.

Moreover, measures are provided in order to prevent an accidental release of the hose coupling 52 of the high-pressure hose conduit 53 from the connecting nipple 45.

For this purpose, the protective pipe 61 is provided with transverse openings 62 through which a fork-shaped locking element 74, 75 can be passed. The locking elements 74, 75 therefore extend transversely to the longitudinal hose direction and also transverse to the longitudinal axis of the protective pipe 61. Each locking element 74, 75 comprises a bracket 76 which is still outside of the protective pipe 61 as well as two prongs 72 connected to one another by the bracket 76. When the locking elements 74, 75 are inserted into the protective pipe, the prongs 77 extend form-fittingly through structures on the exterior side of the hose coupling 52. These structures can be the circumferential grooves 69 of the hose coupling 52 that in practice are present anyway or can be appropriately designed recesses or undercuts on the hose coupling 52.

In this way locking of the hose coupling 52 and thus of the hydraulic hose relative to the surrounding protective pipe 61 is achieved, in particular the longitudinal direction, so that with simple technical means an accidental release of the high-pressure hose from the high-pressure connector 44, 45 is prevented.

The invention is not limited to the illustrated embodiments but applies also in many variants to hydraulic devices with a high-pressure connector, in particular, for example, pressure medium-operated power wrenches as they are disclosed in DE 10 2004 019 425 A1 owned by the instant applicant, wherein its disclosure is incorporated by reference in its entirety into this description.

The specification incorporates by reference the entire disclosure of German priority document 10 20087 058 923.3 having a filing date of 25 Nov. 2008.

While specific embodiments of the invention have been shown and described in detail to illustrate the inventive principles, it will be understood that the invention may be embodied otherwise without departing from such principles.

What is claimed is:

1. A safety device on a high-pressure connector of a hydraulic screw tensioning device, comprising:
a shield surrounding the high-pressure connector and catching hydraulic liquid that escapes at high pressure;
wherein the shield comprises a housing surrounding sealtightly a pressure medium distributor of the high-pressure connector, wherein the pressure medium distributor is connected to the housing and has a connecting nipple for a high-pressure hose conduit adapted to be coupled by a hose coupling to the connecting nipple;
wherein the housing has an open side that is open toward the hydraulic screw tensioning device and wherein the open side of the housing is sealed by seals relative to the hydraulic screw tensioning device;
wherein the shield further comprises a protective pipe connected to the housing;
wherein the protective pipe is open outwardly at a free end remote from the housing and the high-pressure hose conduit exits from the protective pipe at the remote end;
wherein the protective pipe has such a length that the protective pipe surrounds protectively the connecting nipple, the hose coupling and a section of the length of the high-pressure hose conduit, which section extends from the hose coupling to the free end;
wherein the protective pipe is a holding and carrying handle for the hydraulic screw tensioning device.

2. The safety device according to claim 1, wherein the housing has a threaded socket that surrounds the connecting nipple and wherein the protective pipe is screwed onto the threaded socket.

3. The safety device according to claim 1, comprising at least one locking element that secures the hose coupling in a longitudinal direction relative to the protective pipe.

4. The safety device according to claim 3, wherein the at least one locking element is arranged to be transversely movable in the protective pipe and comprises at least one locking section, wherein the at least one locking section is adapted to engage form-fittingly a recess or an undercut of the hose coupling.

5. The safety device according to claim 3, wherein the at least one locking element engages form-fittingly a circumferentially groove of the hose coupling.

6. The safety device according to claim 5, wherein the at least one locking element is embodied as a fork and wherein the protective pipe has transverse openings, wherein the fork is adapted to be pushed through the transverse openings such that the hose coupling extends between two prongs of the fork.

7. The safety device according to claim 1, wherein the handle has an outer circumferential surface provided with ergonomically designed gripping grooves.

* * * * *